United States Patent
Nakagawa et al.

(10) Patent No.: US 7,823,560 B2
(45) Date of Patent: Nov. 2, 2010

(54) STRADDLE-TYPE VEHICLE

(75) Inventors: Yoshitomi Nakagawa, Shizuoka (JP);
Akira Hiratsuka, Shizuoka (JP);
Yuuichirou Watanabe, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 12/418,395

(22) Filed: Apr. 3, 2009

(65) Prior Publication Data

US 2009/0260908 A1 Oct. 22, 2009

(30) Foreign Application Priority Data

Apr. 21, 2008 (JP) .............................. 2008-109763

(51) Int. Cl.
*F02D 9/00* (2006.01)
(52) U.S. Cl. ...................................... 123/399; 701/110
(58) Field of Classification Search ................. 701/110; 123/399, 361
See application file for complete search history.

(56) References Cited

U.S. PATENT DOCUMENTS

| | | | | |
|---|---|---|---|---|
| 6,551,213 | B2 * | 4/2003 | Suzuki ........................ | 477/111 |
| 6,866,021 | B2 * | 3/2005 | Miyashita et al. ............ | 123/399 |
| 7,559,304 | B2 * | 7/2009 | Kataoka et al. ........... | 123/179.4 |
| 2008/0154472 | A1 * | 6/2008 | Okuda et al. ................... | 701/93 |
| 2010/0059018 | A1 * | 3/2010 | Akatsuka ..................... | 123/399 |

FOREIGN PATENT DOCUMENTS

JP 2006-104953 4/2006

* cited by examiner

*Primary Examiner*—Hai H Huynh
(74) *Attorney, Agent, or Firm*—Dickstein Shapiro LLP

(57) ABSTRACT

A straddle-type vehicle includes an engine, an air intake pipe, a throttle valve being controlled in accordance with an operation amount of an accelerator grip, an engine rotating speed detector or a vehicle speed detector, and an electronic control unit (ECU). The ECU increases the opening degree of the throttle valve or maintains the opening degree at a constant value until the engine rotating speed reaches a set rotating speed which is smaller than a prescribed rotating speed, but if the engine rotating speed exceeds the set rotating speed, the ECU reduces the opening degree of the throttle valve irrespective of operation of the accelerator grip.

12 Claims, 5 Drawing Sheets

STRADDLE-TYPE VEHICLE

PRIORITY INFORMATION

This patent application is based on and claims priority under 35 U.S.C. §119 to Japanese Patent Application No. 2008-109763, filed on Apr. 21, 2008, the entire contents of which is hereby expressly incorporated by reference.

TECHNICAL FIELD

The present invention relates to a straddle-type vehicle.

BACKGROUND

In a straddle-type vehicle, there is a known technique in which if the vehicle is driven such that a rotating speed of an engine or a vehicle speed reaches a prescribed value, the engine rotating speed or the vehicle speed does not exceed the prescribed value. Such a known technique is described, for example, in Japanese Laid-open Patent Application Publication No. 2006-104953.

According to the technique described in Japanese Laid-open Patent Application Publication No. 2006-104953, in a motorcycle having an electronically controlled throttle among the straddle-type vehicles, if an engine rotating speed or a vehicle speed reaches a prescribed value, an opening degree of a throttle valve is reduced lower than a standard opening degree of the throttle valve in accordance with an accelerator operation amount. As a result, an air intake amount is reduced and the engine output is limited. With this, the engine rotating speed or the vehicle speed is limited such that the speed does not exceed the prescribed value. The technique described in the Japanese Laid-open Patent Application Publication No. 2006-104953 is characterized in that the combustion stability of the engine can be enhanced when the output is limited as compared with a conventional technique in which the engine output is limited due to cutting or reducing the engine ignition or due to stopping of the fuel supply. Therefore, it is possible to prevent the driver ride comfort and exhaust performance from deteriorating.

However, in the straddle-type vehicle described in the Japanese Laid-open Patent Application Publication No. 2006-104953, a control for decreasing the opening degree of the throttle valve is started when the speed reaches the prescribed value. Therefore, if the control is performed such that the speed does not exceed the prescribed value, the ride comfort (decelerating feeling is generated) deteriorates, and there is a fear that the speed exceeds the prescribed value in some cases.

SUMMARY

The present invention has been accomplished in view of the circumstances, and it is an object of the invention to provide a straddle-type vehicle capable of preventing the engine rotating speed or the vehicle speed from exceeding the prescribed value without deteriorating the ride comfort.

The straddle-type vehicle of the invention includes an engine, an air intake passage for introducing air into the engine, an electronic control throttle valve which is disposed in the air intake passage and which is controlled in accordance with an operation amount of an accelerator operating element, a detector which detects a rotating speed of the engine or a vehicle speed, and a control apparatus which controls the throttle valve such that a detected speed which is the rotating speed of the engine or the vehicle speed detected by the detector is equal to or lower than a prescribed value. The control apparatus increases the opening degree of the throttle valve or maintains the opening degree at a constant value until the detected speed is equal to a predetermined speed which is smaller than the prescribed value, and the control apparatus decreases the opening degree of the throttle valve if the detected speed exceeds the predetermined speed which is smaller than the prescribed value.

According to the present invention, it is possible to provide a straddle-type vehicle capable of preventing the engine rotating speed or the vehicle speed from exceeding the prescribed value without deteriorating the ride comfort.

DETAILED DESCRIPTION

Embodiments of the present invention will be explained with reference to the appended drawings.

Figure 1:
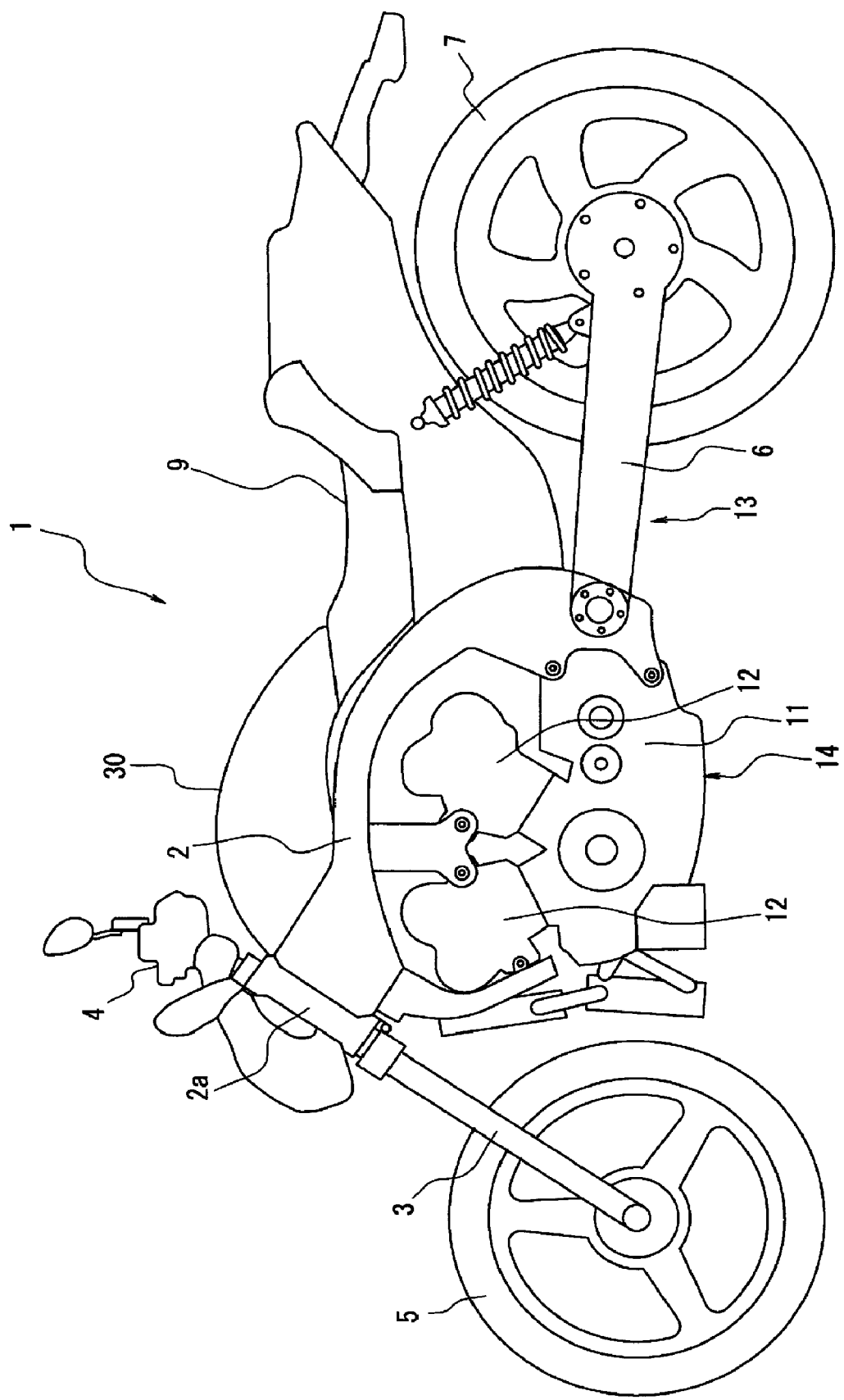
FIG. 1 shows a left side view of a motorcycle.

As one example of a straddle-type vehicle in accordance with the embodiments of the invention, a motorcycle 1 is shown in FIG. 1. The motorcycle 1 is a so-called motor type motorcycle. The straddle-type vehicle of the embodiment of the invention may be a road racer type, off-road type, scooter type, or a so-called moped type motorcycle. The straddle-type vehicle of the embodiment of the invention may be an all-terrain vehicle or a four-wheeled buggy. In the following description, left and right directions mean left and right directions as viewed from a rider who sits on a seat 9 of the motorcycle 1 unless otherwise specified. As shown in FIG. 1, the motorcycle 1 of the embodiment of the invention includes a vehicle body frame 2 having a head pipe 2a. A fuel tank 30 and the seat 9 are supported by the vehicle body frame 2.

A front fork 3 is supported by the head pipe 2a so it can turn relative to the head pipe 2a. A handle 4 is mounted on an upper portion of the front fork 3. A front wheel 5 is rotatably supported by a lower portion of the front fork 3.

An engine 12 is suspended on the vehicle body frame 2. In this embodiment, the engine 12 is a V-twin, four-cycle engine using gasoline as fuel. However, the number of cylinders of the engine 12 is not limited. The engine 12 may be a two-cycle engine. The engine 12 may be an air-cooled engine or a water-cooled engine.

A swing arm 6 is swingably mounted on a rear end of the vehicle body frame 2. A rear wheel 7 is rotatably mounted on a rear end of the swing arm 6.

The motorcycle 1 includes a transmission 11 having a plurality of gears. The motorcycle 1 can run at a predetermined transmission ratio by way of the transmission 11. That is, the transmission 11 changes the rotating speed of the engine 12 to a predetermined rotating speed. The transmission 11 may be a so-called AT (Automatic Transmission) in which the transmission ratio is automatically changed in accordance with vehicle speed or engine rotating speed, or the transmission 11 may be a MT (Manual Transmission) in which the transmission gear ratio is changed by a rider's operation. In the motorcycle 1, the engine 12 and the transmission 11 constitute a power unit 14. The transmission 11 is a five-speed transmission, but the number of speeds is not limited. The number of speeds may be determined such that a necessary transmission ratio can be obtained during running of the motorcycle 1.

The rear wheel 7 of the motorcycle 1 is connected to the engine 12 through a power transmission mechanism 13. The rear wheel 7 is driven based on rotation of the engine 12. The rotation of the engine 12 is transmitted to the rear wheel 7 through the transmission 11 and the power transmission mechanism 13. The type of power transmission mechanism 13 is not especially limited. The power transmission mechanism 13 may include a belt drive mechanism which transmits the rotation of the engine 12 to the rear wheel 7 through a belt. The power transmission mechanism 13 may be a chain drive mechanism which transmits the rotation of the engine 12 to the rear wheel 7 through a chain, or may have a shaft drive mechanism which transmits the rotation of the engine 12 to the rear wheel 7 by means of rotation of a shaft.

Figure 2:
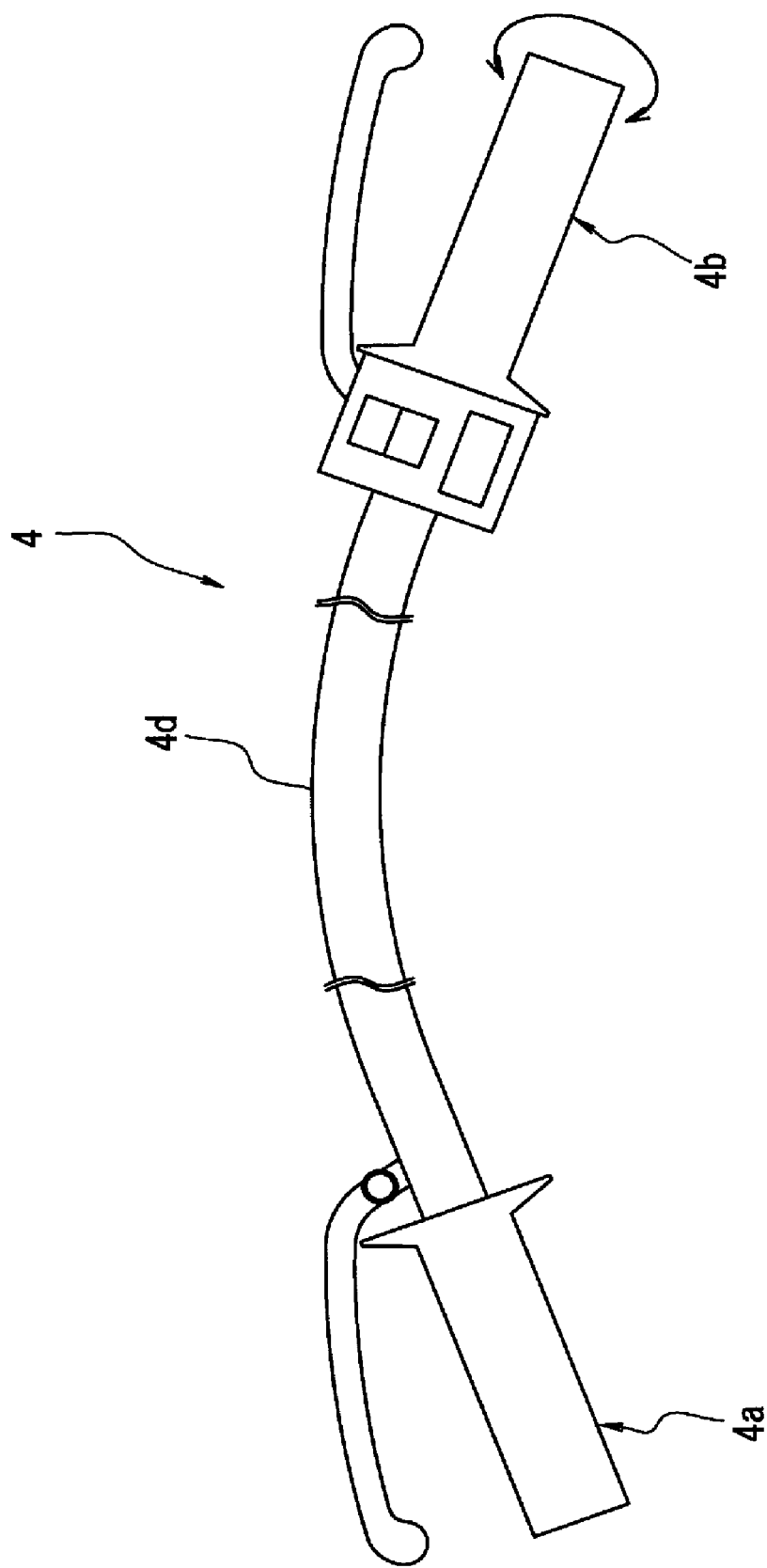
FIG. 2 shows a handle of the motorcycle of FIG. 1.

FIG. 2 shows the handle 4 mounted on the upper portion of the front fork 3 of the motorcycle 1. The handle 4 includes a handle bar 4d connected to the head pipe 2a. The handle 4 includes a left grip 4a located on a left end of the handle bar 4d, and a right grip 4b located on a right end of the handle bar 4d. The right grip 4b can rotate with respect to the handle bar 4d. If a rider rotates the right grip 4b, a throttle valve 32 (see FIG. 3) is operated and the throttle opening degree is adjusted. In this embodiment, the right grip 4b is called an accelerator grip 4b. An accelerator opening degree sensor 44 (see FIG. 3) is mounted on the accelerator grip 4b. The operation amount of the accelerator grip 4b is detected by the accelerator opening degree sensor 44.

Figure 3:
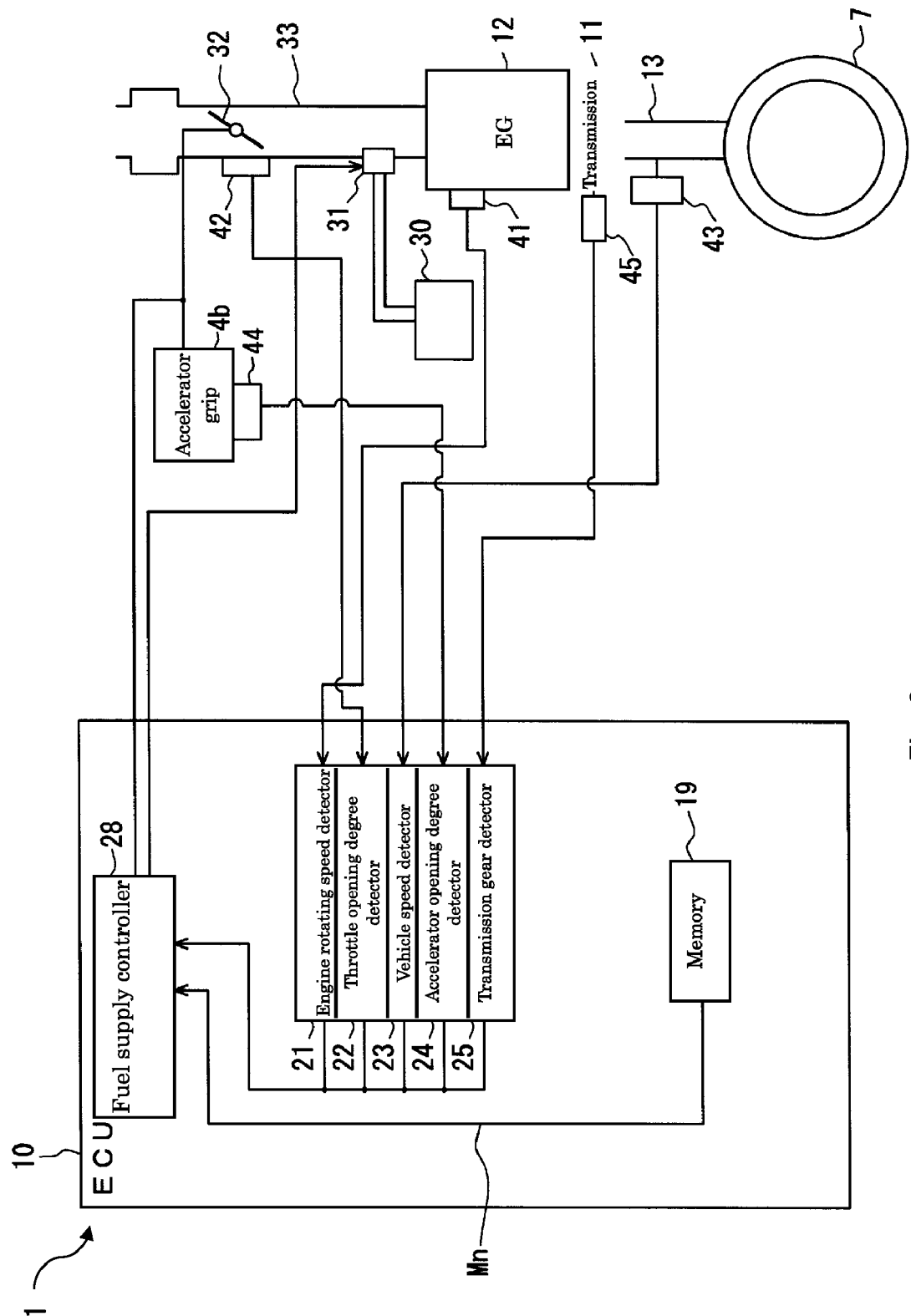
FIG. 3 is a control block diagram of the motorcycle of FIG. 1.

As shown in FIG. 3, a fuel supply apparatus 31 supplies fuel to the engine 12 from a fuel tank 30. The fuel supply apparatus 31 may directly inject fuel to the air intake pipe 33, or the fuel supply apparatus 31 may pump up fuel by air flow in the air intake pipe 33 and create air-fuel mixture. The throttle valve 32 is disposed in the air intake pipe 33. The throttle valve 32 is provided for adjusting the amount of air fuel mixture flowing through the air intake pipe 33 by adjusting the flow path area within the air intake pipe 33. The throttle valve 32 is driven based on operation of the accelerator grip 4b (see FIG. 2). The throttle valve 32 is opened by operation of the accelerator grip 4b, and the air intake amount flowing through the air intake pipe 33 is increased. In accordance with this, the output of the engine 12 is varied.

A throttle opening degree sensor 42 is mounted on the throttle valve 32. The opening degree of the throttle valve 32 is detected by the throttle opening degree sensor 42.

FIG. 3 shows a throttle control system in accordance with one embodiment. As shown in FIG. 3, the motorcycle 1 includes an ECU (Electronic Control Unit)10 as a control apparatus. The ECU 10 includes detectors which detect the running state of the motorcycle 1 or the output state of the engine 12 such as engine rotating speed detector 21, throttle opening degree detector 22, vehicle speed detector 23, accelerator opening degree detector 24, and transmission gear detector 25. The ECU 10 also includes a memory module 19 in which data necessary for running of the motorcycle 1 is stored.

The engine rotating speed detector 21 inputs a signal to the fuel supply controller 28 which is based on the rotating speed of the engine 12 detected by an engine rotating speed sensor 41. The motorcycle 1 is provided with an engine rotating speed sensor 41. The engine rotating speed sensor 41 directly or indirectly detects the rotating speed of the engine 12. When the engine rotating speed sensor 41 indirectly detects the rotating speed of the engine 12, the engine rotating speed detector 21 has a calculating function. In this case, the engine rotating speed detector 21 calculates the engine rotating speed based on the output state of the engine 12 as sensed by the rotating speed sensor 41. Alternatively, the ECU 10 may have a calculator (not shown), and the calculator may calculate the engine rotating speed. In this case, the calculator calculates the engine rotating speed based on the output state of the engine 12. The engine rotating speed detector 21 inputs a signal to the fuel supply controller 28 which is based on the calculated engine rotating speed.

The throttle opening degree detector 22 inputs a signal to the fuel supply controller 28 which is based on the opening degree of the throttle valve 32. In FIG. 3, the motorcycle 1 is provided with the throttle opening degree sensor 42. The throttle opening degree sensor 42 detects the opening degree of the throttle valve 32.

The vehicle speed detector 23 inputs a signal to the fuel supply controller 28 which is based on the vehicle speed of the motorcycle 1 detected by a vehicle speed sensor 43. In the motorcycle 1 shown in FIG. 3, the power transmission mechanism 13 is provided with the vehicle speed sensor 43. The vehicle speed sensor 43 need not be mounted on the power transmission mechanism 13, as shown in FIG. 3. The vehicle speed sensor 43 may be mounted on the engine 12 and may read the output state of the engine 12. The vehicle speed sensor 43 may be mounted on the transmission 11 and may read the rotation of the transmission 11. The vehicle speed sensor 43 may be mounted on the rear wheel 7 or the front wheel 5 (see FIG. 1) and may read the rotating speed of the front wheel 5 or the rear wheel 7. The vehicle speed sensor 43 indirectly detects the vehicle speed of the motorcycle 1. With this, the vehicle speed detector 23 has a function such as calculation, and calculates the vehicle speed by the output state of the engine 12, the rotating speed of the front wheel 5 or the rotating speed of the rear wheel 7. Alternatively, the ECU 10 may include a calculator (not shown) and the calculator may calculate the vehicle speed. In this case, the vehicle speed detector 23 inputs a signal which is based on the calculated vehicle speed.

The accelerator opening degree detector 24 inputs a signal to the fuel supply controller 28 which is based on opening/closing of the accelerator grip 4b. As described above, the accelerator opening degree sensor 44 is mounted on the accelerator grip 4b. The accelerator opening degree sensor 44 detects the operation amount of the accelerator grip 4b.

The transmission gear detector 25 inputs a signal to the fuel supply controller 28 which is based on the current transmission gear of the transmission 11. The current transmission gear of the transmission 11 is detected by a transmission gear sensor 45. In FIG. 3, the transmission gear sensor 45 is mounted on the transmission 11.

The fuel supply controller 28 controls the throttle opening degree TH of the throttle valve 32 based on values detected by the detectors, the engine rotating speed $R_P$ in a map $M_n$ stored in the memory module 19, the throttle opening degree $TH_P$ and the accelerator opening degree $G_P$. Here, $R_P$, $G_P$ and $TH_P$ are set values of the engine rotating speed R, the accelerator opening degree G and the throttle opening degree TH, respectively, at each point on the map $M_n$. The fuel supply controller 28 inputs a predetermined map $M_n$ from the memory module 19. The fuel supply controller 28 inputs a signal which is based on the detected engine rotating speed by the engine rotating speed detector 21. Similarly, the fuel supply controller 28 inputs a signal which is based on the throttle opening degree detected by the throttle opening degree detector 22, inputs a signal which is based on the vehicle speed detected by the vehicle speed detector 23, inputs a signal which is based on the accelerator opening degree detected by the accelerator opening degree detector 24, and inputs a signal which is based on the current transmission gear detected by the transmission gear detector 25. The throttle valve 32 receives a signal from the fuel supply controller 28 which is based on the map $M_n$ and values detected by the detectors and transmitted to the fuel supply controller 28. The throttle valve 32 adjusts the opening degree of the valve based on the signal. With this, the air intake amount to the engine 12 is adjusted. The output of the engine 12 is varied based on the air intake amount which is adjusted by opening/closing of the throttle valve 32.

The fuel supply controller 28 controls the amount of fuel supply provided to the engine 12 by the fuel supply apparatus 31 based on the values detected by the detectors, and the engine rotating speed $R_P$, the throttle opening degree $TH_P$ and the accelerator opening degree $G_P$ in the map $M_n$ stored in the memory 19. The fuel supply apparatus 31 adjusts the fuel supply amount to the engine 12 based on the signal. The output of the engine 12 is varied based on the fuel amount supplied from the fuel supply apparatus 31.

Data which is necessary for driving the motorcycle 1 is stored in memory module (storage device) 19. In the embodiment, at least a later-described map $M_n$ (in the following description, the subscript n represents the number of transmission gears in the transmission 11) is stored in the memory module 19.

Figure 4A:
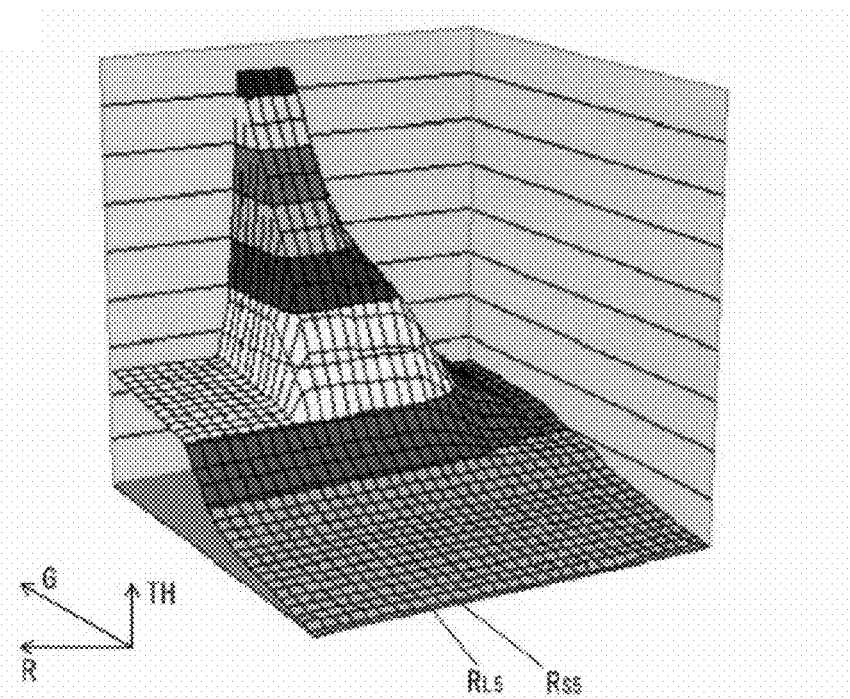
FIG. 4A is a three-dimensional diagram illustrating a map of engine rotating speed, throttle opening degree and accelerator opening degree for a fifth speed in a transmission for the motorcycle.
Figure 4B:
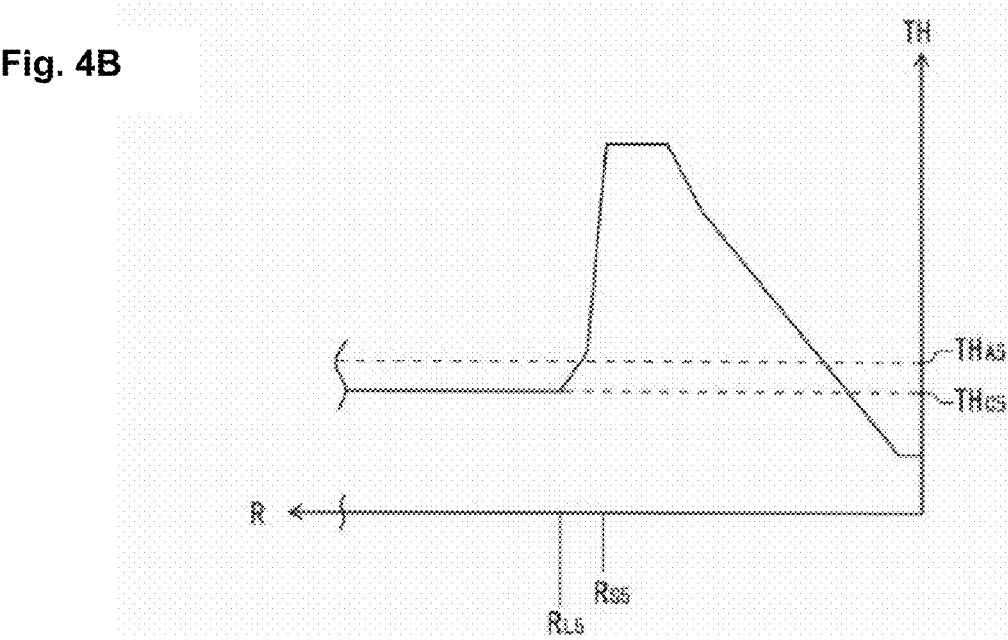
FIG. 4B is a two-dimensional diagram illustrating a map of engine rotating speed and throttle opening degree for a fifth speed in the transmission.

As shown in FIGS. 4A-4B, the map $M_n$ in the embodiment sets values of the engine rotating speed R, the throttle opening degree TH, and the accelerator opening degree G. The map $M_n$ is set for each transmission gear of the transmission 11. In this embodiment, the transmission 11 has five transmission gears. Therefore, five maps $M_n$ for the first to fifth gears are set. The first gear map is identified as map $M_1$. The second to fifth gear maps are respectively identified as map $M_2$, map $M_3$, map $M_4$ and map $M_5$ in this order. The maps $M_n$ used during running of the motorcycle 1 are shifted in accordance with the transmission gears of the transmission 11.

FIGS. 4A -4B show the map $M_5$. As shown in FIG. 4A, the map $M_n$ of the embodiment including the map $M_5$ sets values of the engine rotating speed R, the throttle opening degree TH and the accelerator opening degree G. FIG. 4B shows a two-dimensional diagram of the engine rotating speed R and the throttle opening degree TH when the accelerator opening degree G is 90°. The units of the engine rotating speed R is (r/min), and the units of the throttle opening degree TH and the accelerator opening degree G are (deg). However, these units are not limited as described above, and, for example, the units of the engine rotating speed R may be (m/s), and the units of the throttle opening degree TH and the accelerator opening degree G may be (%). Here, r represents the number of rotations, min represents time (minutes), deg represents angle, m represents length (meters) and s represents time (seconds).

As shown in FIGS. 4A and 4B, if the engine rotating speed R exceeds a predetermined value, the throttle opening degree TH decreases when the accelerator opening degree is equal to or higher than the predetermined accelerator opening degree G. The predetermined engine rotating speed R at that time is called a set rotating speed $R_{S5}$. In this embodiment, the set rotating speed $R_{S5}$ is set to 7500 r/min. The set rotating speed $R_{S5}$ is a constant value which is not influenced by the accelerator opening degree G.

When the accelerator opening degree is equal to or higher than the predetermined accelerator opening degree G, after the engine rotating speed R exceeds the set rotating speed $R_{S5}$ and increases, the throttle opening degree TH becomes constant at the prescribed engine rotating speed R. The prescribed engine rotating speed R at that time is called prescribed rotating speed $R_{L5}$. The prescribed rotating speed $R_{L5}$ is a value corresponding to the prescribed vehicle speed $V_L$ based on the driving performance or the engine 12 and the running performance of the motorcycle 1. As shown in FIGS. 4A and 4B, in this embodiment, the prescribed rotating speed $R_{L5}$ is set to 8500 r/min. The prescribed rotating speed $R_{L5}$ is set to a constant value irrespective of the accelerator opening degree G on the map $M_5$. The throttle opening degree TH which exceeds the prescribed rotating speed $R_{L5}$ and becomes a constant value is called a converged opening degree $TH_{C5}$. The converged opening degree $TH_{C5}$ in the fifth speed is a throttle opening degree TH which is smaller than the acceleration-enable opening degree $TH_{A5}$ of the motorcycle 1 at which the motorcycle 1 can accelerate. Therefore, when the motorcycle 1 runs faster than the prescribed rotating speed $R_{L5}$, the motorcycle 1 can not accelerate.

Figure 5A:
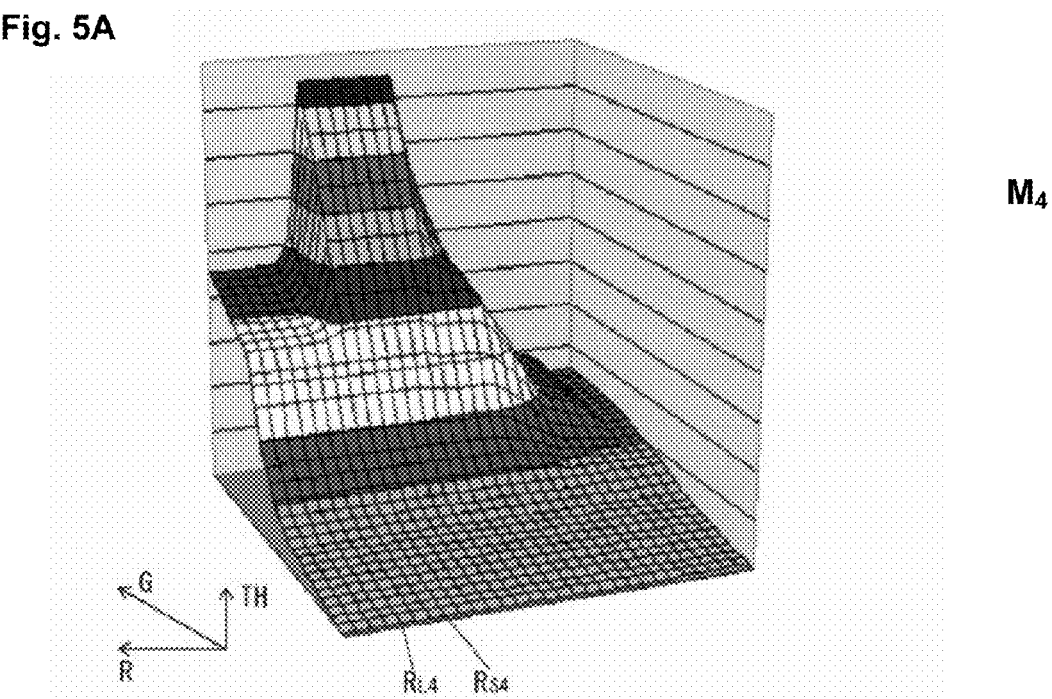
FIG. 5A is a three-dimensional diagram illustrating a map of engine rotating speed, throttle opening degree and accelerator opening degree for a fourth speed in the motorcycle transmission.
Figure 5B:
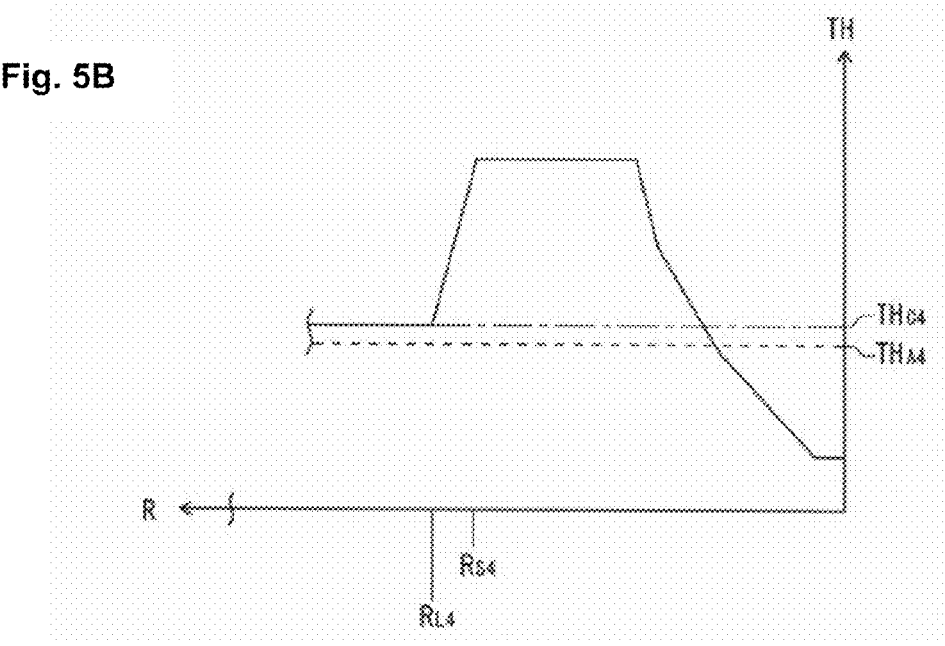
FIG. 5B is a two-dimensional diagram illustrating a map of engine rotating speed and throttle opening degree for a fourth speed in the motorcycle transmission.

FIGS. 5A-5B show the map $M_4$. FIG. 5A is a three-dimensional map showing values of the engine rotating speed R, the throttle opening degree TH and the accelerator opening degree G. FIG. 5B shows a two-dimensional diagram example of the engine rotating speed R and the throttle opening degree TH when the accelerator opening degree G is 90°.

As shown in FIGS. 5A and 5B, if the engine rotating speed R exceeds a predetermined value, the throttle opening degree TH decreases when the accelerator opening degree is equal to or higher than the predetermined accelerator opening degree G. The predetermined engine rotating speed R at that time is called set rotating speed $R_{S4}$. In this embodiment, the set rotating speed $R_{S4}$ is set to 9000 r/min. The set rotating speed $R_{S4}$ is a constant value irrespective of the accelerator opening degree G. However, the set rotating speed $R_{S5}$ of the fifth speed and the set rotating speed $R_{S4}$ of the fourth speed are different from each other.

When the accelerator opening degree is equal to or higher than the predetermined accelerator opening degree G, after the engine rotating speed R becomes higher than the set rotating speed $R_{S4}$, the throttle opening degree TH becomes constant at the prescribed engine rotating speed R. The prescribed engine rotating speed R at that time is called prescribed rotating speed $R_{L4}$. The prescribed rotating speed $R_{L4}$ is a value corresponding to the prescribed vehicle speed $V_L$ based on the driving performance of the engine 12 or the running performance of the motorcycle 1. In this embodiment, the prescribed rotating speed $R_{L4}$ is set to 10000 r/min. The prescribed rotating speed $R_{L4}$ is set to a constant value irrespective of the accelerator opening degree G on the map $M_4$. The throttle opening degree TH which exceeds the prescribed rotating speed $R_{L4}$ and becomes a constant value is called a converged opening degree $TH_{C4}$. At the converged opening degree $TH_{C4}$ of the fourth speed, the throttle opening degree TH is higher than the acceleration-enable opening degree $TH_{A4}$ at which the motorcycle 1 can accelerate. Therefore, when the motorcycle 1 runs faster than the prescribed rotating speed $R_{L4}$, the motorcycle 1 can accelerate.

The output of the engine 12 is varied by adjusting the throttle opening degree TH in this manner. The vehicle speed V of the motorcycle 1 is varied based on the variation of the output of the engine 12 and the transmission ratio of the transmission 11.

Operation and Effect

According to the embodiment, when the engine rotating speed R reaches the set rotating speed $R_{Sn}$, which is smaller than the prescribed rotating speed $R_{Ln}$, the throttle opening degree TH decreases. In this case, as compared with a case where the throttle opening degree TH is reduced when the engine rotating speed R reaches the prescribed rotating speed $R_{Ln}$, it is possible to more reliably prevent the rotating speed R of the engine 12 or the vehicle speed V of the motorcycle 1 from exceeding its prescribed value. As described above, the engine rotating speed R at which the throttle opening degree TH is reduced is lower than the prescribed rotating speed $R_{Ln}$. Thus, in this case, it is possible to suppress the deterioration of the ride comfort of the motorcycle 1 as compared with a case where the throttle opening degree TH is suddenly reduced when the engine rotating speed R reaches the prescribed rotating speed $R_{Ln}$.

As shown in FIGS. 4 and 5, the throttle opening degree TH is gradually reduced until the rotating speed R reaches the prescribed rotating speed $R_{Ln}$ after the rotating speed R exceeds the set rotating speed $R_{Sn}$. In this case, it is possible to suppress the deterioration of the ride comfort of the motorcycle 1 as compared with a case where the throttle opening degree TH is suddenly reduced when the engine rotating speed R exceeds the set rotating speed $R_{Sn}$. When the throttle opening degree TH is suddenly reduced when the engine rotating speed R exceeds the set rotating speed $R_{Sn}$, the set rotating speed $R_{S5}$ coincides with the engine rotating speed R when the opening degree becomes the converged opening degree TH in FIG. 5B, and when the set rotating speed $R_{S4}$ coincides with the engine rotating speed R when the opening degree becomes the converged opening degree TH in FIG. 4B.

The value of the set rotating speed $R_{Sn}$ is constant irrespective of the accelerator opening degree G on the map $M_n$. Therefore, when the rotating speed R of the engine 12 or the vehicle speed V of the motorcycle 1 exceeds the prescribed value, the throttle opening degree TH is controlled by the ECU 10 irrespective of operation of the accelerator grip 4b by a rider who rides the motorcycle 1. With this setup, it is possible to more reliably prevent the engine 12 or the motorcycle 1 from exceeding the predetermined state.

The set rotating speeds $R_{Sn}$ of two adjacent transmission gears of the transmission 11 are different from each other. More specifically, in this embodiment, the set rotating speed $R_{S5}$ of the fifth speed is 7500 r/min, and the set rotating speed $R_{S4}$ of the fourth speed is 9000 r/min. Therefore, when the motorcycle 1 runs at an engine rotating speed R which is relatively close to the set rotating speed $R_{S5}$ of the fifth speed and the gear is shifted down to the fourth speed, hard engine braking is suppressed. When the motorcycle 1 runs at an engine rotating speed R which is relatively close to the set rotating speed $R_{S4}$ of the fourth speed and the gear is shifted up to the fifth speed, the motorcycle 1 can further accelerate. Thus, according to the motorcycle 1 of the embodiment, it is possible to prevent the ride comfort from being deteriorated.

In the motorcycle 1, the control for reducing the opening degree of the throttle valve 32 when the throttle opening degree TH exceeds the set rotating speed $R_{Sn}$ is executed in accordance with a value which is set in the map $M_n$. Therefore, when the throttle opening degree TH is adjusted to a predetermined value, superfluous control replay such as feedback control is unnecessary. Thus, the control speed of the motorcycle 1 can be enhanced in the adjustment of the opening degree of the throttle opening degree TH. If data which is set in the map $M_n$ is precise, relatively precise control can be executed. If data which is set in the map $M_n$ is set precisely, cost performance is excellent and the data can be set easily as compared with a case where high precision is maintained in the actual control of the motorcycle 1.

In the first embodiment, the control for stopping the fuel supply and the control for cancelling the ignition are carried out based on the map $M_n$ in which the engine rotating speed R, the throttle opening degree TH and the accelerator opening degree G are set. However, the vehicle speed V, the throttle opening degree TH and the accelerator opening degree G may be set in the map. A map in which the vehicle speed V, the throttle opening degree TH and the accelerator opening degree G are set is called a map $M_n'$ for the sake of convenience. The maps $M_n'$ are switched for the transmission gears of the transmission 11 like the map $M_n$. Therefore, five maps $M_n$ for the first to fifth gears are set. The first gear map would correspond to a map $M_1$. The first (V/TH/G) gear map would be identified with a map $M_1'$. The second to fifth (V/TH/G) gear maps are identified by map $M_2'$, map $M_3'$, map $M_4'$ and map $M_5'$ in this order.

In the map $M_n'$, the prescribed vehicle speed $V_L$ is set as a predetermined value. In the map $M_n'$, the prescribed vehicle speed $V_L$ is set to a value corresponding to the prescribed rotating speed $R_{Ln}$. The prescribed rotating speed $R_L$ is a value based on the driving performance of the engine 12 or the running performance of the motorcycle 1. In the map $M_n'$, a set vehicle speed $V_S$ which is smaller than the prescribed vehicle speed $V_L$ is set as a predetermined value. Therefore, in the transmission 11, a gear having large deceleration ratio (e.g., first to second speeds) can not reach the prescribed vehicle speed $V_L$ and the set vehicle speed $V_S$. In this case, in the map $M_n'$, there is a map $M_n'$ in which the prescribed vehicle speed $V_L$ and the set vehicle speed $V_S$ are not substantially set. Maps $M_n'$ in which the prescribed vehicle speed $V_L$ and the set vehicle speed $V_S$ are not set are the map $M_1'$ and the map $M_{n2}'$.

The fuel supply controller 28 shown in FIG. 3 executes the control for adjusting the opening degree of the throttle valve 32 based on values detected by the detectors and a value set in the map $M_n'$. The fuel supply controller 28 executes control for stopping the fuel supply in the fuel supply apparatus 31 based on the values detected by the detectors and a value set in the map $M_n'$. The fuel supply controller 28 executes control for cancelling the ignition in an igniter based on the values detected by the detectors and a value set in the map $M_n'$.

The same control as that of the previous embodiment can be carried out using the vehicle speed V instead of the engine rotating speed R. With this, the above-described effect can be obtained.

The value of the "prescribed vehicle speed $V_L$" is not especially limited, but is a vehicle speed smaller than the maximum speed of the straddle-type vehicle for example. The maximum speed is, for example, a self-determined restrained upper limit value, i.e., limiter vehicle speed. Even if the motorcycle 1 reaches the prescribed vehicle speed $V_L$, the motorcycle 1 does not reach the limiter vehicle speed.

The present invention is useful for a straddle-type vehicle. The present invention may be changed in design within a range and scope described in the claims.

What is claimed:

1. A straddle-type vehicle, comprising:
an engine;
an air intake passage for introducing air into the engine;
an electronic control throttle valve which is disposed in the air intake passage and which is controlled in accordance with an operational amount of an accelerator operating element;
a detector which detects a rotating speed of the engine or a vehicle speed, and
a control apparatus which controls the throttle valve such that a detected speed which is the rotating speed of the engine or the vehicle speed detected by the detector is equal to or lower than a prescribed value, wherein the control apparatus increases an opening degree of the throttle valve or maintains the opening degree at a constant value until the detected speed is equal to a predetermined speed which is smaller than the prescribed value, and the control apparatus decreases the opening degree of the throttle valve if the detected speed exceeds the predetermined speed which is smaller than the prescribed value.

2. The straddle-type vehicle of claim 1, wherein the control apparatus gradually decreases the opening degree of the throttle valve if the detected speed exceeds the predetermined speed.

3. The straddle-type vehicle of claim 1, wherein the predetermined speed is constant irrespective of the operation amount of the accelerator operating element.

4. The straddle-type vehicle of claim 1, further comprising a transmission having a plurality of transmission gears, wherein at least two transmission gears have different predetermined speeds.

5. The straddle-type vehicle of claim 1, further comprising a storage device in which maps of respective transmission gears concerning an accelerator opening degree, a throttle opening degree, and detected speed are stored, wherein the control apparatus sends a control signal to decrease the opening degree of the throttle valve in accordance with the stored maps.

6. A throttle control apparatus for a throttle valve of an engine, comprising:
a plurality of detectors, at least one of the detectors being configured to detect the rotational speed of the engine;
a memory module; and
a fuel supply controller which receives inputs from the plurality of detectors and the memory module and is configured to control the opening degree of the throttle valve based on values detected by the detectors and so that the rotational speed of the engine is equal to or lower than a predetermined value, wherein the fuel supply controller is configured to increase or maintain at a constant value the opening degree of the throttle valve until the detected speed is equal to a predetermined speed which is smaller than the prescribed value, and the fuel supply controller is configured to decrease the opening degree of the throttle valve if the detected speed exceeds the predetermined speed which is smaller than the prescribed value.

7. The throttle control apparatus of claim 6, wherein the plurality of detectors includes an engine rotating speed detector.

8. The throttle control apparatus of claim 6, wherein the plurality of detectors includes a throttle opening degree detector.

9. The throttle control apparatus of claim 6, wherein the plurality of detectors includes a vehicle speed detector.

10. The throttle control apparatus of claim 6, wherein the plurality of detectors includes an accelerator opening degree detector.

11. The throttle control apparatus of claim 6, wherein the plurality of detectors includes a transmission gear detector.

12. The throttle control apparatus of claim 6, wherein the fuel supply controller controls the opening degree of the throttle valve based on a map of control values stored in the memory module.

* * * * *